May 5, 1970 K. WILFERT 3,510,148
WHEEL SUSPENSION, ESPECIALLY FOR MOTOR VEHICLES
Filed April 18, 1968

INVENTOR
KARL WILFERT
BY Craig & Antonelli
ATTORNEYS

United States Patent Office 3,510,148
Patented May 5, 1970

---

3,510,148
WHEEL SUSPENSION, ESPECIALLY FOR MOTOR VEHICLES
Karl Wilfert, Gerlingen-Waldstadt, Germany, assignor to Daimler-Benz Aktiengesellschaft, Stuttgart-Unterturkheim, Germany
Filed Apr. 18, 1968, Ser. No. 722,346
Claims priority, application Germany, Apr. 22, 1967,
D 52,899
Int. Cl. B60g 3/18
U.S. Cl. 280—96.2      14 Claims

ABSTRACT OF THE DISCLOSURE

A wheel suspension, especially for motor vehicles, in which the wheel carriers are pivotally guided by load-absorbing, superposed guide members, the lower guide members of which are supported on a torsion-rigid element that itself is rotatably supported against spring action at the vehicle superstructure or at the body whereby the horizontal straight line through the point of rotation of the guide members has a vertical spacing from the axis of rotation of the torsion-rigid element.

---

BACKGROUND OF THE INVENTION

The present invention relates to a wheel suspension for vehicles, especially for motor vehicles, in which the wheel carriers are pivotally guided by means of load-absorbing guide members arranged one above the other in a pair-wise manner. It aims at enabling a transverse yieldingness of the lower guide members.

SUMMARY OF THE INVENTION

The present invention essentially consists in that the lower guide members, which are preferably constructed as triangularly shaped wishbones, are jointly supported against spring effect on a torsion-rigid element which is rotatably supported at the body structure whereby the horizontal straight line through the point of rotation of the guide members has a vertical spacing from the axis of rotation of the torsion-resistant element. By the use of this arrangement, the support bearings of the guide members constructed as cross guide members receive a lever arm with respect to the axis of rotation of the torsion-rigid or torsion-resistant element. In case of lateral shocks and impacts against the wheel, a moment results about the axis of rotation of the torsion-rigid element which seeks to rotate the same against the spring action. A transverse yieldingness of the lower cross guide members is made possible in this manner. By reason of the fact that the bearing supports of the cross guide members are both arranged on a torsion-rigid element, the bearings always carry out the same movement so that no influence of the steering kinematics occurs.

In a structurally simple manner, the torsion-resistant or torsion-rigid element may consist of a pipe, preferably of a quadrangular pipe. A very torsion-rigid element is produced thereby with inexpensive means and slight expenditures.

Advantageously, the pipe is retained in elastic bearings which permit only an exactly defined rotary movement. This type of construction represents an inexpensive, though completely satisfactory solution from a technical point of view, of the bearings rotatable against spring action. Appropriately, the elastic bearings are constructed polygonal, preferably rectangular. With the use of a quadrangular pipe as torsion-resistant element and of rectangular elastic bearings, one may dispense with the need to rigidly connect the spring elements, consisting, for the most part of rubber, with the pipe or with the bearing.

Accordingly, it is an object of the present invention to provide a wheel suspension, especially for motor vehicles which avoids by simple means the shortcomings and drawbacks encountered with the prior art constructions.

Another object of the present invention resides in a wheel suspension of the type described above which enables a transverse yieldingness of the lower guide members.

A further object of the present invention resides in a wheel suspension which not only achieves a transverse yieldingness but at the same time does not affect the steering kinematics of the suspension.

A still further object of the present invention resides in a wheel suspension achieving all of the aforementioned aims and objects with inexpensive means and slight expenditures.

Still another object of the present invention resides in a wheel suspension which produces a transverse yieldingness in a completely satisfactory manner from a technical point of view.

These and other objects, features, and advantages of the present invention will become more obvious from the following description when taken in connection with the accompanying drawing which shows, for purposes of illustration only, one embodiment in accordance with the present invention in, which:

Figures 1, 2, 3:
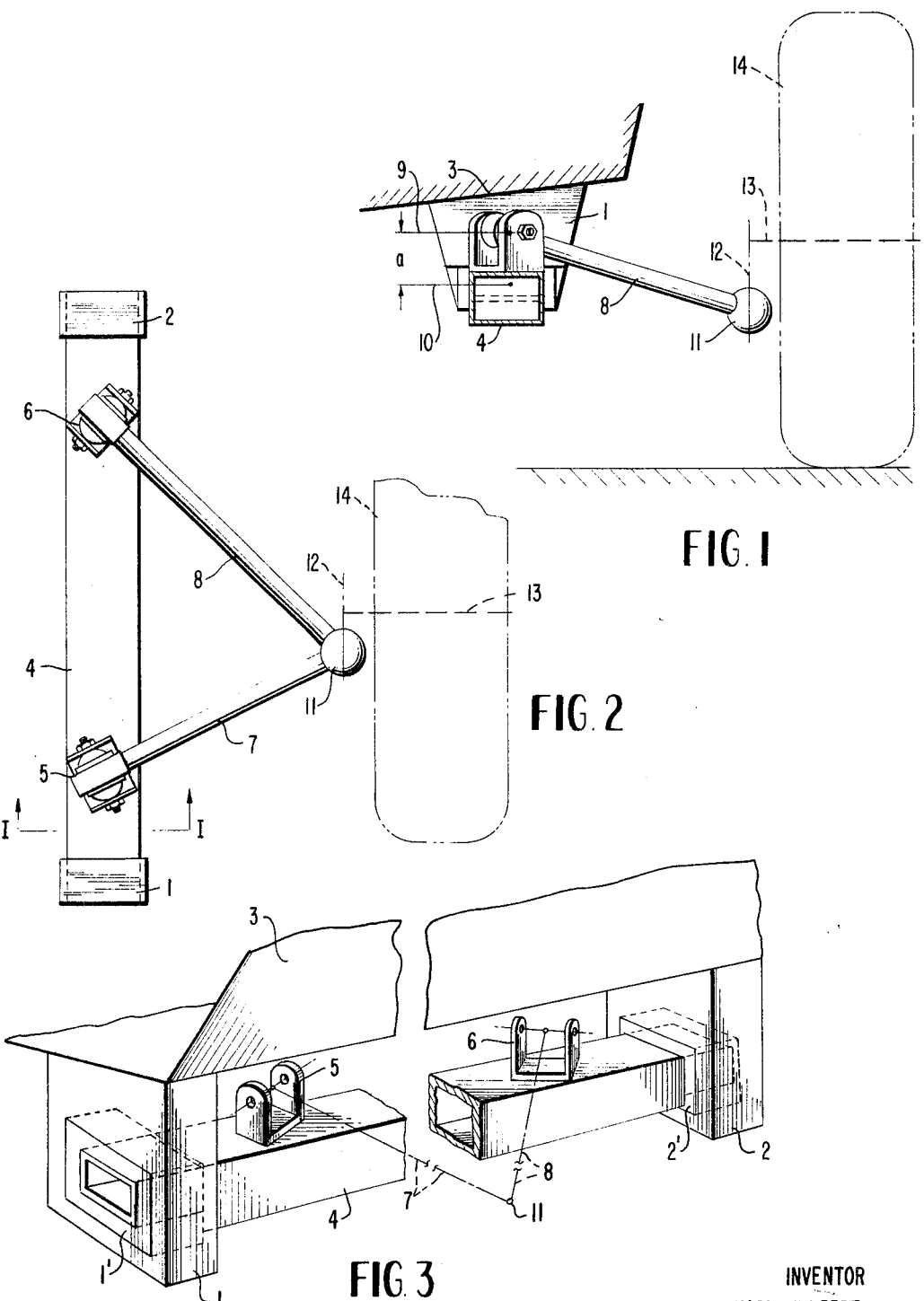
FIG. 1 is a somewhat schematic partial cross-sectional view, through a wheel suspension of a front wheel according to the present invention which is provided with guide members constructed as wishbones and taken along line I—I of FIG. 2.
FIG. 2 is a plan view on the arrangement of FIG. 1, however, omitting for sake of clarity the vehicle body.
FIG. 3 is a partial perspective view of the bearing support in accordance with the present invention.

Referring now to the drawing wherein like reference numerals are used throughout the various views to designate like parts, in the bearing support illustrated in FIGS. 1 to 3 of the lower triangular guide member or wishbone for a front wheel, elastic bearings 1 and 2 are secured at the vehicle body 3 of any conventional construction. A quadrangular pipe 4 or similar structural element is supported in the elastic bearings 1 and 2 by means of the elastic, for example, of rubber elements 1' and 2'; the bearing supports 5 and 6 of the lower guide members constructed as cross guide members 7 and 8 are so secured in the quadrangular pipe 4 that a vertical distance $a$ (FIG. 1) is kept between the horizontal straight line 9 extending through the point of rotation of the cross members 7 and 8 and the horizontal axis 10, which passes through the point of rotation of the quadrangular pipe 4 in its bearing support within the elastic rubber elements 1' and 2' in the bearings 1 and 2. The cross guide members 7 and 8 extend from the bearing mounts 5 and 6 up to a common ball head 11 where they are connected in a conventional manner with the steering knuckle 12 that carries on an axle or spindle 13 the wheel 14. The steering mechanism for adjusting the front wheel is not illustrated since it is of any conventional construction, forming no part of the present invention. Similarly, a showing of the upper guide members for the steering knuckle 12 is dispensed with since it may be of any known construction.

The quadrangular pipe 4 may, as shown in FIG. 1, be offset or reduced at its ends and the bearing mounts 5 and 6 may be appropriately secured on the wider surface of the quadrangular pipe 4.

If a lateral force now acts on the front wheel 14, then a moment with the lever arm $a$ results about the axis 10 of the quadrangular pipe 4. This moment seeks to rotate the quadrangular pipe 4 against the effect of the elastic bearings 1 and 2. The elastic bearings 1 and 2 permit a predetermined rotation corresponding to their dimensions whereby a transverse yieldingness of the lower guide member or wishbone is achieved and therewith also a transverse yieldingness of the wheel 14 itself.

As is illustrated in particular in FIG. 2, the quadrangular pipe 4 is constructed relatively sturdily with respect to the cross guide members. This construction assures that the quadrangular pipe 4 is torsion-rigid in any case. It is made certain by the present invention that no influencing of the steering kinematics takes place by the transversely yielding bearing support of the lower guide members or wishbones because both bearings of the guide members 7 and 8 can carry out only identical pivotal movements about the point of rotation of the quadrangular pipe 4 located on the axis 10.

While I have shown and described only one embodiment in accordance with the present invention, it is understood that the same is not limited thereto but is susceptible of numerous changes and modifications as known to a person skilled in the art.

I claim:
1. A wheel suspension for vehicles, especially for motor vehicles in which the wheel carriers are pivotally guided by load-absorbing guide members arranged in a pair-wise manner one above the other, wherein the improvement comprises a torsion-rigid element, support means for supporting both of the lower guide members on said torsion-rigid element, a relatively fixed vehicle part, and means rotatably supporting said torsion-rigid element at said fixed part against spring action in such a manner that the straight-line through the point of rotation of the guide members has a certain vertical distance from the axis of rotation of the torsion-rigid element.
2. A wheel suspension according to claim 1, wherein the lower guide members are constructed as wishbones.
3. A wheel suspension according to claim 2, wherein said torsion-rigid element consists of a pipe.
4. A wheel suspension according to claim 3, wherein said torsion-rigid element consists of a quadrangular pipe.
5. A wheel suspension according to claim 3, wherein said torsion-rigid element is retained in elastic bearings which permit only an exactly defined rotary movement.
6. A wheel suspension according to claim 5, wherein said elastic bearings are polygonal.
7. A wheel suspension according to claim 5, wherein said elastic bearings are rectangular.
8. A wheel suspension according to claim 1, wherein said torsion-rigid element consists of a pipe.
9. A wheel suspension according to claim 1, wherein said torsion rigid element is retained in elastic bearings which permit only an exactly defined rotary movement.
10. A wheel suspension according to claim 9, wherein said elastic bearings are polygonal.
11. A wheel suspension for vehicles with a superstructure, in which a wheel carrier is pivotally guided by load-absorbing upper and lower guide members, wherein the improvement comprises torsion-resistant means, and support means for pivotally supporting the lower guide members on said torsion-resistant means, and for rotatably supporting said torsion-resistant means at said superstructure to provide limited rotary movement in such a manner that the two lower guide members can carryout only substantially identical pivotal movements about the axis of rotation of said torsion-resistant means.
12. A wheel suspension according to claim 11, wherein said torsion-resistant means is a substantially closed bearer structure.
13. A wheel suspension according to claim 11, wherein said torsion-resistant means is supported in elastic bearing means permitting only an exactly defined rotary movement.
14. A wheel suspension according to claim 12, wherein said elastic bearing means are polygonal in cross section.

References Cited
UNITED STATES PATENTS

| | | | |
|---|---|---|---|
| 2,226,406 | 12/1940 | Krotz | 267—57.1 |
| 2,715,022 | 8/1955 | Krotz | 263—63 X |
| 2,925,264 | 2/1960 | Loehr | 280—124 X |
| 3,006,627 | 10/1961 | Paulsen | 267—57.1 |
| 3,273,910 | 9/1966 | Willingshofer | 280—96.2 |
| 3,204,979 | 9/1965 | Lawson | 267—21 X |
| 3,353,840 | 11/1967 | Loye | 267—21 X |

KENNETH H. BETTS, Primary Examiner